(12) United States Patent
Gurney et al.

(10) Patent No.: US 8,159,791 B2
(45) Date of Patent: Apr. 17, 2012

(54) MAGNETORESISTIVE SENSOR HAVING QUANTUM WELL STRUCTURE AND A TRAPPING LAYER FOR PREVENTING CHARGE CARRIER MIGRATION

(75) Inventors: Bruce Alvin Gurney, San Jose, CA (US); Ernesto E. Marinero, Saratoga, CA (US)

(73) Assignee: Hitachi Global Storage Technologies Netherlands B.V., Amsterdan (NL)

( * ) Notice: Subject to any disclaimer, the term of this patent is extended or adjusted under 35 U.S.C. 154(b) by 1107 days.

(21) Appl. No.: 12/027,213

(22) Filed: Feb. 6, 2008

(65) Prior Publication Data

US 2009/0195939 A1    Aug. 6, 2009

(51) Int. Cl.
*G11B 5/39* (2006.01)
(52) U.S. Cl. ........................................ 360/324; 360/313
(58) Field of Classification Search ........ 360/313–324.2
See application file for complete search history.

(56) References Cited

U.S. PATENT DOCUMENTS

| | | | | |
|---|---|---|---|---|
| 4,274,890 | A | 6/1981 | Varon | 148/171 |
| 5,657,189 | A | 8/1997 | Sandhu | 360/112 |
| 5,680,280 | A | 10/1997 | Seabaugh et al. | 360/110 |
| 5,760,427 | A | 6/1998 | Onda | 257/194 |
| 5,798,540 | A | 8/1998 | Boos et al. | 257/194 |
| 6,133,593 | A | 10/2000 | Boos et al. | 257/194 |
| 6,703,639 | B1 | 3/2004 | Yang et al. | 257/14 |
| 6,924,218 | B2 | 8/2005 | Marsh et al. | 438/570 |
| 7,135,411 | B2 | 11/2006 | Nam et al. | 438/714 |
| 7,208,775 | B2 * | 4/2007 | Osipov et al. | 257/103 |
| 7,470,925 | B2 * | 12/2008 | Tamura et al. | 257/9 |
| 7,564,656 | B2 * | 7/2009 | Gurney et al. | 360/316 |
| 2006/0076577 | A1 | 4/2006 | Boos et al. | 257/194 |
| 2006/0193080 | A1 | 8/2006 | Chattopadhyay et al. | 360/112 |

FOREIGN PATENT DOCUMENTS

| | | |
|---|---|---|
| JP | 3093018 | 4/1991 |
| JP | 5211117 | 8/1993 |

OTHER PUBLICATIONS

Bolognesi et al., "InAs/AlSb Heterostructure field-effect transistors using a Si-doped InAs/AlSb short-period superlattice modulation doping barrier" J. Vac. Sci. Technol. A 16(2), Mar./Apr. 1998, 1998 American Vacuum Society.
Bolognesi et al., "InAs channel heterostructure-field effect transistors with InAs/AlSb short-period superlattice barriers" Appl. Phys. Lett. 69 (23), Dec. 2, 1996, American Institute of Physics.
Bolognesi et al., "High-Transconductance Delta-Doped InAs/AlSb HFET's with Ultrathin Silicon-Doped InAs Quantum Well Donor Layer" IEEE Electron Device Letters, vol. 19, No. 3, Mar. 1998.
Werking et al., "High-Transconductance InAs/AlSb Heterojunction Field-Effect Transistors with =-Doped AlSb Upper Barriers", Mar. 1992.

* cited by examiner

*Primary Examiner* — Allen Heinz
(74) *Attorney, Agent, or Firm* — Zilka-Kotab, PC

(57) ABSTRACT

A Lorentz Magnetoresistive sensor having an ultrathin trapping layer disposed between a quantum well structure and a surface of the sensor. The trapping layer prevents charge carriers from the surface of the sensor from affecting the quantum well structure. This allows the quantum well structure to be formed much closer to the surface of the sensor, and therefore, much closer to the magnetic field source, greatly improving sensor performance. A Lorentz Magnetoresistive sensor having a top gate electrode to hinder surface charge carriers diffusing into the quantum well, said top gate electrode being either a highly conductive ultrathin patterned metal layer or a patterned monoatomic layer of graphene.

17 Claims, 9 Drawing Sheets

MAGNETORESISTIVE SENSOR HAVING QUANTUM WELL STRUCTURE AND A TRAPPING LAYER FOR PREVENTING CHARGE CARRIER MIGRATION

FIELD OF THE INVENTION

The present invention relates generally to magnetoresistive sensors that employ the Lorentz force, and which therefore can exhibit the Corbino Effect, the Hall Effect or a combination of the two (collectively called Lorentz Magnetoresistors), and more particularly to an extraordinary magneto resistance (EMR) sensor design for increasing the data storage density and data rate of a magnetic recording system.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is oriented generally perpendicular to the air bearing surface (ABS) and the magnetic moment of the free layer is oriented generally parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The drive for ever increasing data rate and data capacity has, however, led researchers to search for new types of magnetoresistive sensors, capable of increased sensitivity at decreased track widths. An important class of potential magnetoresistive sensors, magnetic recording sensors and scanning sensors, called Lorentz Magnetoresistors, rely on the Lorentz force resulting from the motion of a charged carrier in a magnetic field. One type of such devices is called a Hall sensor. Another is what has been called an Extraordinary Magnetoresistive Sensor (EMR). An advantage of these sensors is that the active region of the sensor is constructed of non-magnetic semiconductor materials, and does not suffer from the problem of magnetic noise that exists in giant magnetoresistive sensors (GMR) and tunnel valves, both of which use magnetic films in their active regions.

The EMR sensor includes a pair of voltage leads and a pair of current leads in contact with one side of the active region and an electrically conductive shunt in contact with the other side of the active region. In the absence of an applied magnetic field, sense current through the current leads passes into the semiconductor active region and is shunted through the shunt. When an applied magnetic field is present, current is deflected from the shunt and passes primarily through the semiconductor active region. The change in electrical resistance due to the applied magnetic field is detected across the voltage leads. EMR is described by T. Zhou et al., "Extraordinary magnetoresistance in externally shunted van der Pauw plates", Appl. Phys. Lett., Vol. 78, No. 5, 29 Jan. 2001, pp. 667-669.

The magnitude of the electrical resistance change in a Lorentz Magnetoresitive device depends on its transport properties such as mobility and the judicious control of the charge carrier density. Therefore, heterostructures employing two dimensional (2DEG) quantum well channels are highly desirable. Such heterostructures, in particular those based on III-V, low effective mass, semiconductors such as InAs, InSb and GaAs are highly desirable and are currently employed in electronic devices wherein said high mobility in the quantum well enables high speed electronics applications.

To ensure high electron mobility in said current-art heterostructures, the 2DEG channel is typically disposed some 20 mm deep into the device and away from the surface. This constitutes a major impediment in the utilization of said III-V 2DEG heterostructures in the fabrication of Lorentz Magnetoresistive sensors for the detection of nanoscale magnetic domains on account of the weak magnetic flux emanating from the recorded bit and the significant spacing loss that placing the active 2DEG channel distant from the sensor surface leads to. This invention provides a solution to this problem.

SUMMARY OF THE INVENTION

The present invention provides a method to decrease the distance between the 2DEG channel and the outermost surface of a semiconductor heterostructure through which the magnetic flux emanating from a nanoscale magnetic domain penetrates the sensor assembly. An example includes an extraordinary magnetoresistive sensor that includes first and second barrier layers and a quantum well structure sandwiched between the first and second barrier layers. An ultrathin trapping layer is disposed between the surface of the sensor and the first and second barrier layers and quantum well structure, the trapping layer preventing migration of charge carriers from the surface of the sensor to the quantum well structure.

The inclusion of the trapping layer between the quantum well structure and the surface of the sensor, advantageously allows the quantum well stricture to be located much closer to the surface of the sensor. Thereby circumventing deleterious charge carrier surface scattering processes and the undesired migration of surface charges into the 2DEG quantum channel. This greatly increases the performance of the sensor by placing the quantum well much closer to the source of magnetic field, such as a magnetic medium.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
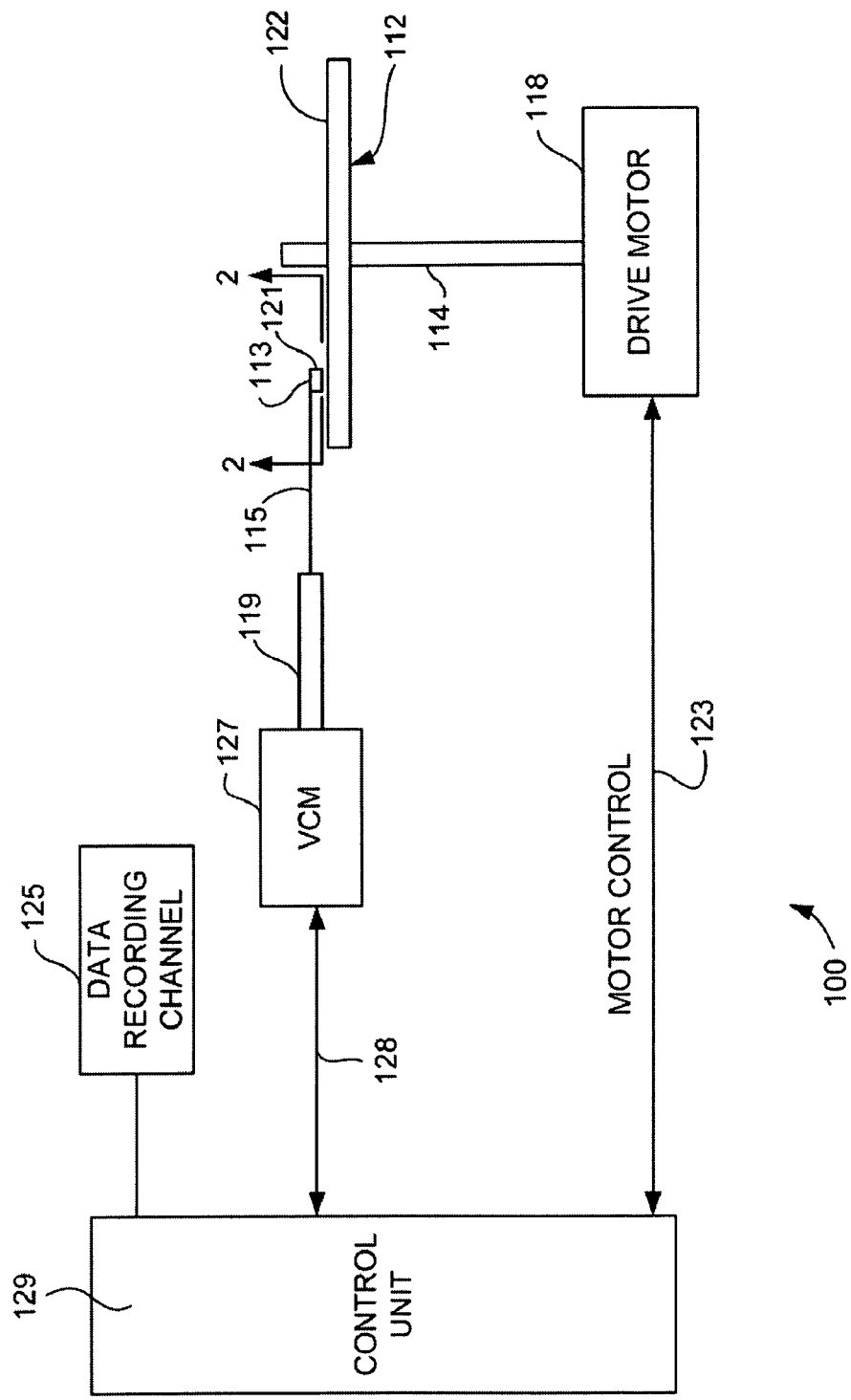
FIG. 1 is a schematic illustration of a disk drive system in which the invention might be embodied.

Referring now to FIG. 1, there is shown a disk drive 100 which could embody this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
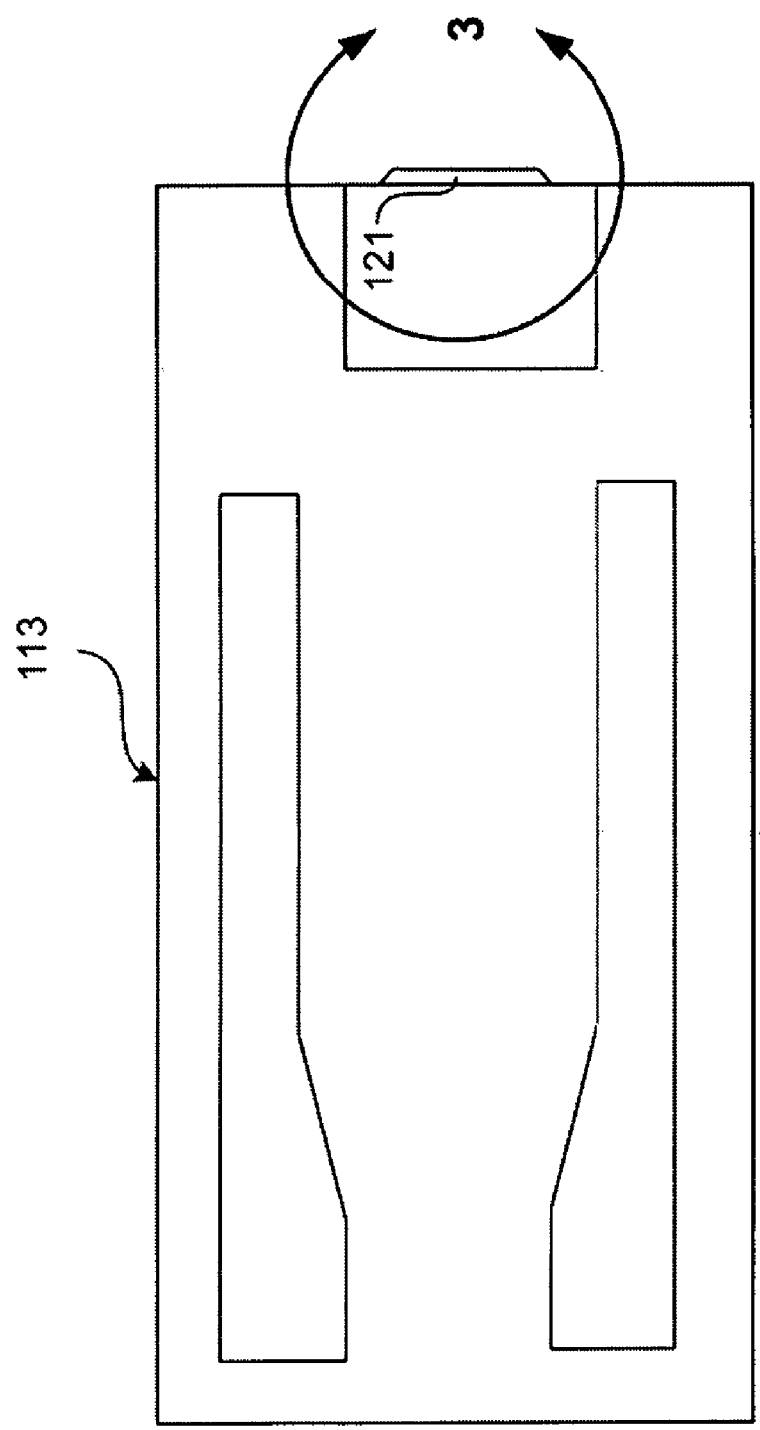
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
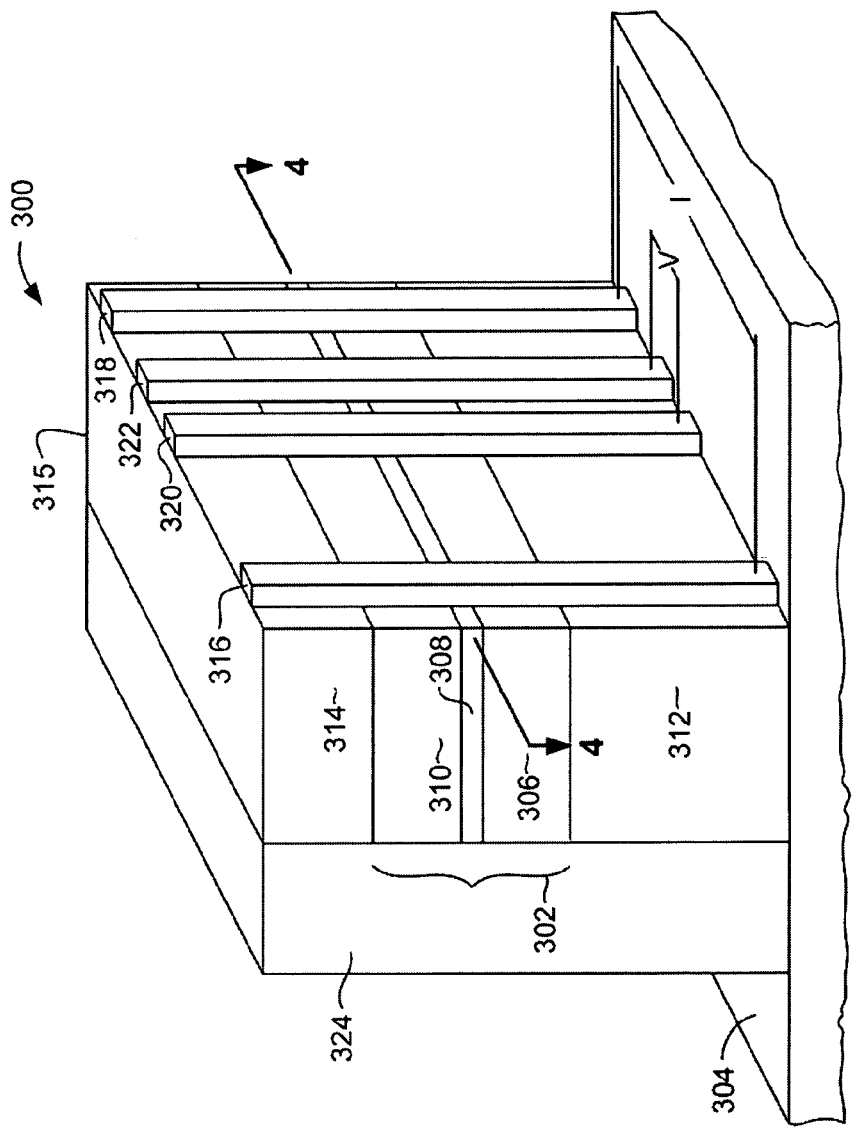
FIG. 3 is schematic, isometric view of an EMR device according to the prior art.

With reference now to FIG. 3, a prior art extraordinary magnetoresistive sensor (EMR) 300 for use in a magnetic head 121 (FIG. 2) is shown. The EMR sensor 300 may include a structure 302 that is a III-V heterostructure formed on a semiconductor substrate 304 such as GaAs or Si. However, the EMR sensor described in this invention is not restricted to III-V semiconductor materials. For example, it may also be formed on the basis of silicon, or germanium. The heterostructure 302 includes a first layer 306 of semi-conducting material having a first band-gap, a second layer 308 of semi-conducting material formed on the first layer 306 and having a second bandgap that is smaller than that of the first layer 306, and a third semi-conducting layer 310 of semi-conducting material formed on top of the second layer 308 and having a third band gap that is greater than the second band gap. The materials in the first and third layers 306, 310 may be similar or identical. An energetic potential well (quantum well) is created by the first, second and third semi-conducting material layers due to the different band-gaps of the different materials. Thus, carriers can be confined inside layer 308, which is considered the EMR active film in the sensor 300. This is also referred to as the quantum well or a two-dimensional electron gas (2DEG) layer.

The first layer 306 is typically formed on top of a buffer layer 312 that may be one or more layers. The buffer layer 312 comprises several periods of a superlattice structure that functions to prevent impurities present in the substrate from migrating into the functional layers 306, 308, 310. In addition, the buffer layer 312 is chosen to accommodate the typically different lattice constants of the substrate 304 and the functional layers of the heterostructure 302 to thus act as a strain relief layer between the substrate and the functional layers.

One or more doped layers are incorporated into the semiconducting material in the first layer 306, the third layer 310, or both layers 306 and 310, and spaced apart from the boundary of the second and third semiconducting materials. The doped layers provide electrons (if n-doped) or holes (if p-doped) to the quantum well. The electrons or holes are concentrated in the quantum well in the form of a two dimensional electron-gas or hole-gas, respectively. Intentional doping layers are not necessary in the case of AlSb/InAs/AlSb heterostructures wherein the electrons originate from deep donors in the AlSb layers as well as from states at the interface between the AlSb and the InAs quantum well.

The layers 306, 308, 310 may be a $Al_{0.09}In_{0.91}Sb/InSb/Al_{0.09}In_{0.91}Sb$ heterostructure grown onto a semi-insulating GaAs or Si substrate 304 with a buffer layer 312 in between. The layers 306, 308, 310 may also be AlSb/InAs/AlSb. InSb, GaAs and InAs are narrow band-gap semiconductors. Narrow band-gap semiconductors typically have a high electron mobility, since the effective electron mass is greatly reduced. For example, the room temperature electron mobility of InSb and InAs are 70,000 $cm^2$/Vs and 35,000 $cm^2$/Vs, respectively.

The bottom $Al_{0.09}In_{0.91}Sb$ layer 306 formed on the buffer layer 312 has a thickness in the range of approximately 1-3 microns and the top $Al_{0.09}In_{0.91}Sb$ layer 310 has a thickness in the range of approximately 10 to 1000 μm, typically 50 nm. The doping layers incorporated into layers 306, 310 have a thickness from one monolayer (delta-doped layer) up to 10 nm. The doping layer is spaced from the $InSb/Al_{0.09}In_{0.91}Sb$ boundaries of first and second or second and third semiconducting materials by a distance of 10-300 Angstrom. n-doping is preferred, since electrons typically have higher mobility than holes. The typical n-dopant is silicon with a concentration in the range of 1 to $10^{19}/cm^3$. In the case of AlSb/InAs/AlSb quantum wells, delta doping is also possible to increment the electron density in the InAs quantum well. This is typically done by intercalating a few monolayers of Te within the AlSb layers. The deposition process for the heterostructure 302 is preferably molecular-beam-epitaxy, but other epitaxial growth methods can be used.

A capping layer 314 is formed over the heterostructure 302 to protect the device from corrosion. The capping layer 314 is formed of an insulating material such as oxides or nitrides of aluminum or silicon (e.g., $Al_2O_3Si_3N_4$,) or a non-corrosive semi-insulating semiconductor. The layers 312, 306, 308, 310, 314 together form a structure that can be referred to as a mesa structure 315.

Two current leads 316, 318 and two voltage leads 320, 322 are patterned over one side of the EMR structure 302 so that they make electrical contact with the quantum well. A metallic shunt 324 is patterned on the side opposite the current and voltage leads of the EMR structure 302 so that it makes electrical contact with the quantum well. An applied magnetic field H (FIG. 4), i.e., the magnetic field to be sensed, is generally oriented normal to the plane of the layers in the EMR structure 302. The leads typically comprise metallic contacts, for example Au, AuGe, or Ge diffused into the device. For the case of an EMR device based on Si, the leads and shunt material are preferably a metallic alloy of Si, such as $TiSi_2$ or regions of highly n-type doping. The leads are typically formed after deposition of the capping layer 314, and sometimes after removal of some of the capping layer material.

Figure 4:
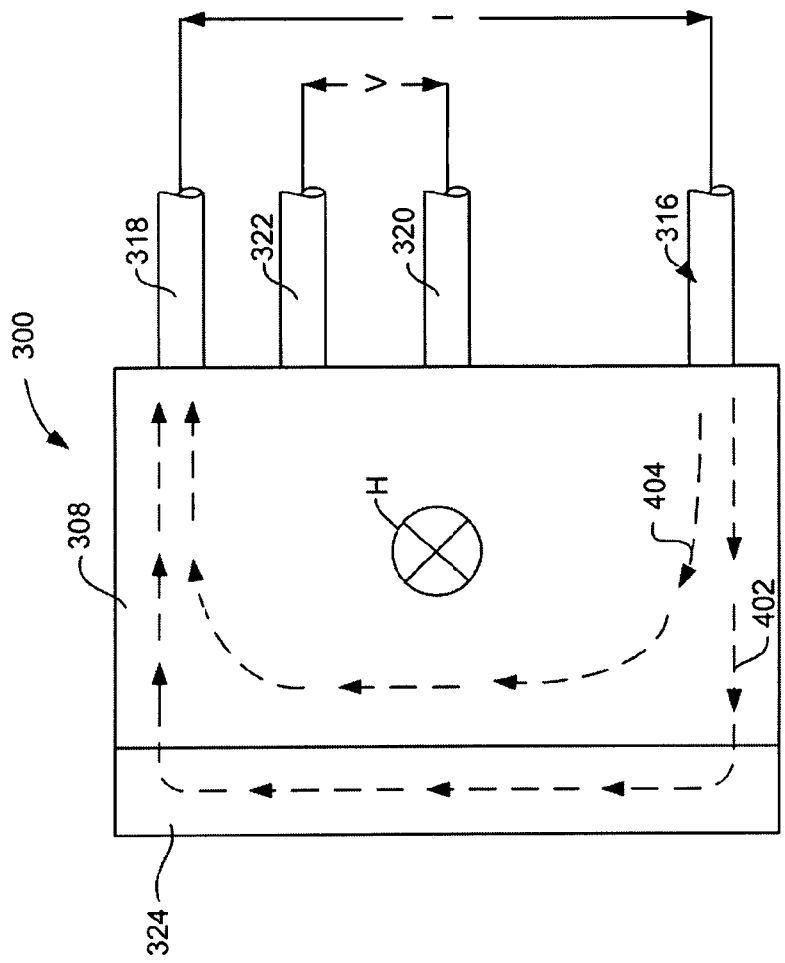
FIG. 4 is a cross sectional view taken from line 4-4 of FIG. 3.

FIG. 4 is a top schematic view of the EMR sensor 300 through a section of the active film 308 and will illustrate the basic operation of the sensor. In the absence of an applied magnetic field H, sense current through the leads 316, 318 passes into the semiconductor active film 308 and is shunted through the shunt 324, as shown by line 402. When an applied magnetic field H, having a component perpendicular to the plane of the layers in the EMR structure 302, is present, as shown by the arrow tail into the paper in FIG. 4, current is deflected from the shunt 324 and more of it flows through the semiconductor active film 308, as shown by line 404. The change in electrical resistance due to the applied magnetic field is detected across the voltage leads 320, 322.

Current quantum well structures are designed so that the two dimensional electron gas (i.e. layer 308) is at least 20 nm from the surface of the heterostructure. Bringing the layer 308 closer to the surface increases the carrier concentration due to contributions from surface states. This hinders the control of the optimum carrier density and mobility in the two dimensional electron gas (2DEG) needed for optimum signal response.

However, it is desirable that the active layer 308 (i.e. the 2DEG layer) be as close to the surface as possible in order to decrease the spacing loss that occurs as a result of the physical separation between the source of magnetic flux (the recorded bit on the magnetic medium) and the active layer 308 of the sensor. The flux decays exponentially with the spacing and scales down with the magnetic volume of the magnetic bit. Therefore, for ultra-high density recording a physical spacing between the sensor layer and the recorded bit of less than 5 nm is desirable for optimum signal response. However, as discussed above, such a small spacing has not been possible, due to the interference of surface charge carriers adversely affecting the transport properties in the active layer (2DEG) layer 308.

Figure 5:
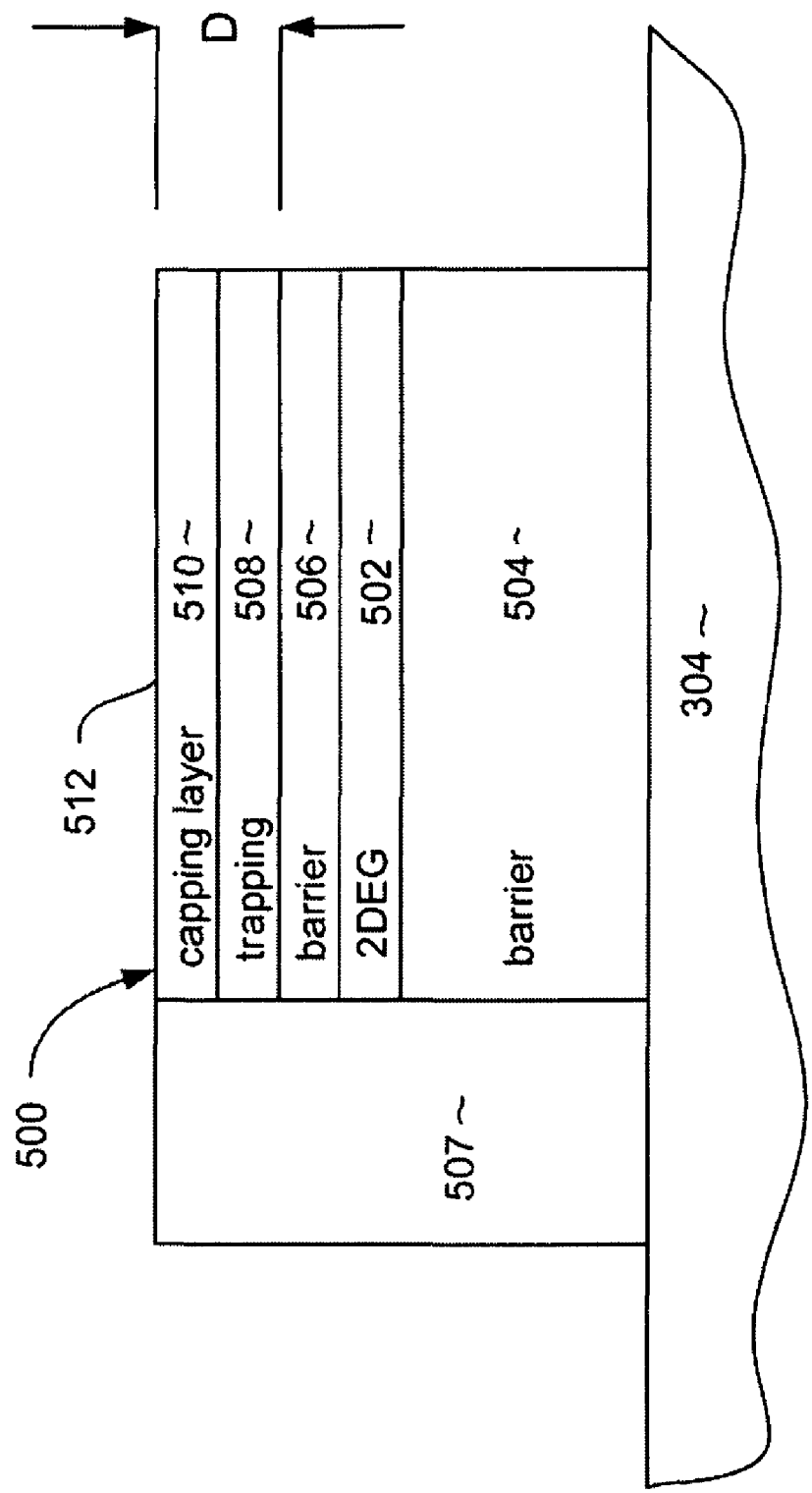
FIG. 5 is cross sectional view of a sensor according to an embodiment of hie invention.

The present invention overcomes this limitation, advantageously allowing the active layer 308 to be close to the surface, while also preventing surface charge carriers from adversely affecting the active layer 308 of the sensor. With reference to FIG. 5, in one possible embodiment of the invention a sensor 500 has an active layer 502 that is sandwiched between first and second barrier layers 504, 506. The active layer 502 can be a two dimensional electron gas (2DEG) or can be a two dimensional hole gas. The active layer 502 can be, for example, InAs. The barrier layers 504, 506 can each be constructed of, for example, AlSb. A magnetic shunt structure 507 is provided at a side of the sensor 500. The sensor 500 can be constructed on substrate that can be a semiconductor substrate such as GaAs or Si.

An ultrathin trapping layer (0.2-2 nm) 508 is provided above the second barrier layer 506, and a capping layer 510 such as InAs can be provided above the trapping layer 508. The trapping layer 508 is constructed so as to prevent charge carriers from migrating from the surface 512 of the sensor 500. While the capping layer 512 provides some protection against surface carrier migration, the addition of the trapping layer 508 provides greatly enhanced protection against such surface charge carrier migration. Therefore the addition of the trapping layer 508 allows the active layer 502 to be constructed much closer to the surface 512 of the sensor, which as mentioned above greatly enhances sensor performance. As a result, the active layer 502 can be constructed to be a distance D of less than 5 nm from the surface 512 from the surface 512 of the sensor 500.

The trapping layer 508 can be constructed as a p-doped layer within the liner material 506, alternatively it can also be an intercalated p doped layer within the capping layer 510 (e.g. p doped InAs). The use of a Be delta doping layer within the AlSb barrier to control carrier contributions from deep donor states in AlSb has been reported by Kadow et al (J. Cryst. Growth, 251, 543, (2003)). In this study the delta layer was disposed 5 nm from the quantum well and 15 nm away from the surface. A linear decrement of the carrier density on Be dopant concentration was observed. In contrast, in this invention, the trapping layer is disposed in the vicinity of the surface to reside in the uppermost layers of the barrier or within the capping layer. Therefore surface state electron migration to the quantum well is inhibited by the trapping layer. The p-dopant in this case can be added to during molecular beam epitaxial growth of the trapping layer 508. Suitable dopants can include Si or Be implanted into the AlSb barrier layer 506, or Si and Be into an InAs capping layer 510. The trapping layer 508 could also be a crystalline or amorphous oxide layer that prevents surface electron transport into the quantum well channel. The trapping layer 508 can also be constructed of a wide gap semiconductor structure such as GaN that possesses a deeper energy well than InAs and would therefore act as an electron trap for surface donor states. Other wide gap semiconductors can be employed, provided that their conduction band have an energy lower than the bottom of the 2DEG conduction band edge. In order for this to happen the band edges and offsets must align properly, with the magnitude of the band gap of the trapping layer being greater than the energy difference between the top of the conduction band of the barrier semiconductor material and the bottom of the valence band of the quantum well semiconductor. For the AlSb/InAs/AlSb case, the band gap should preferably be greater than 1.7 eV.

Figure 6:
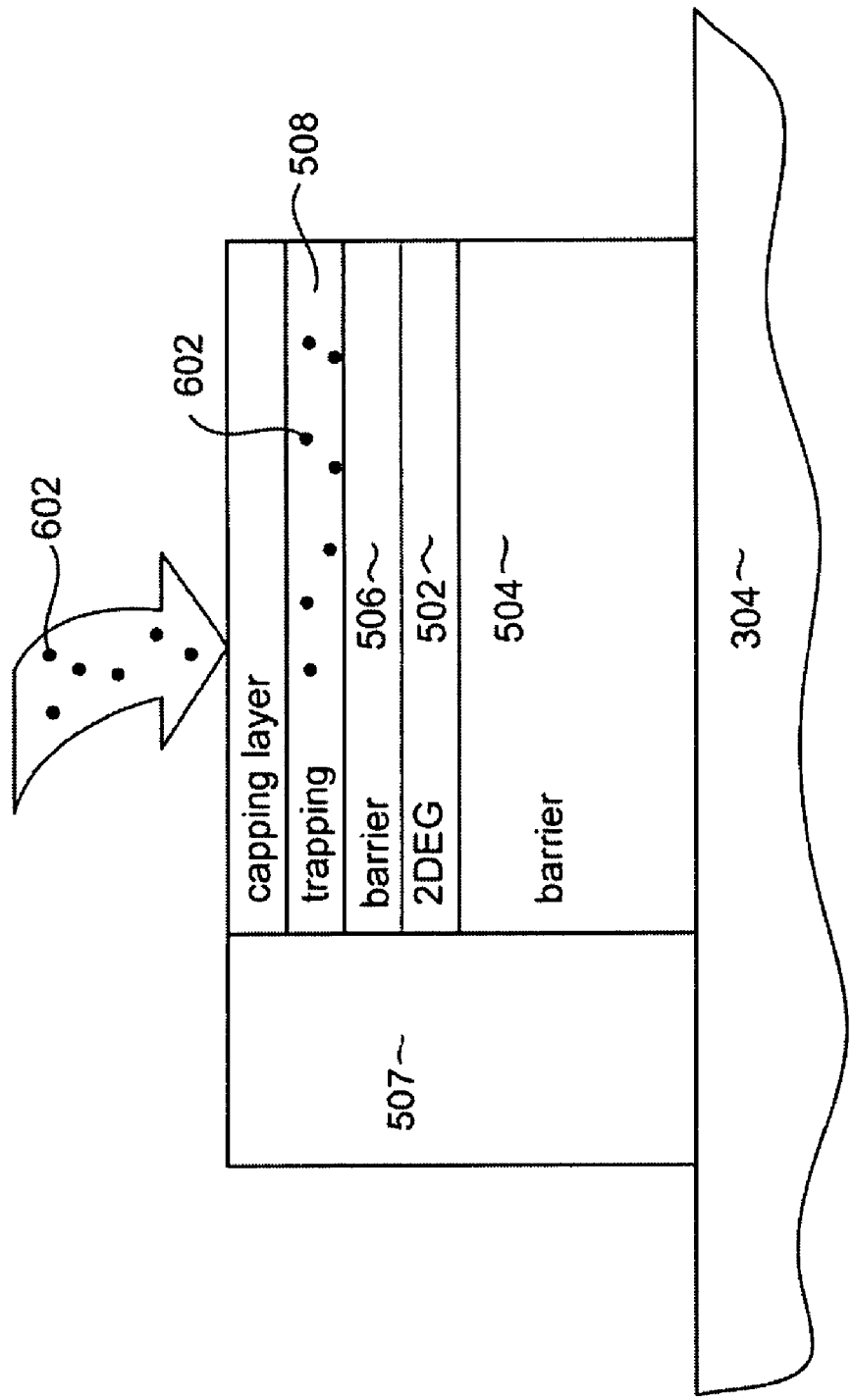
FIG. 6 is a cross sectional view of a sensor according to another embodiment of the invention.

In another embodiment of the invention, the trapping layer 508 can be an ion implanted layer. With reference to FIG. 6, such a trapping layer can be constructed by shallow implantation of ions 602 through a lithographic mask structure to generate a device with modulated regions of the two-dimensional sheet carrier density.

Figure 7:
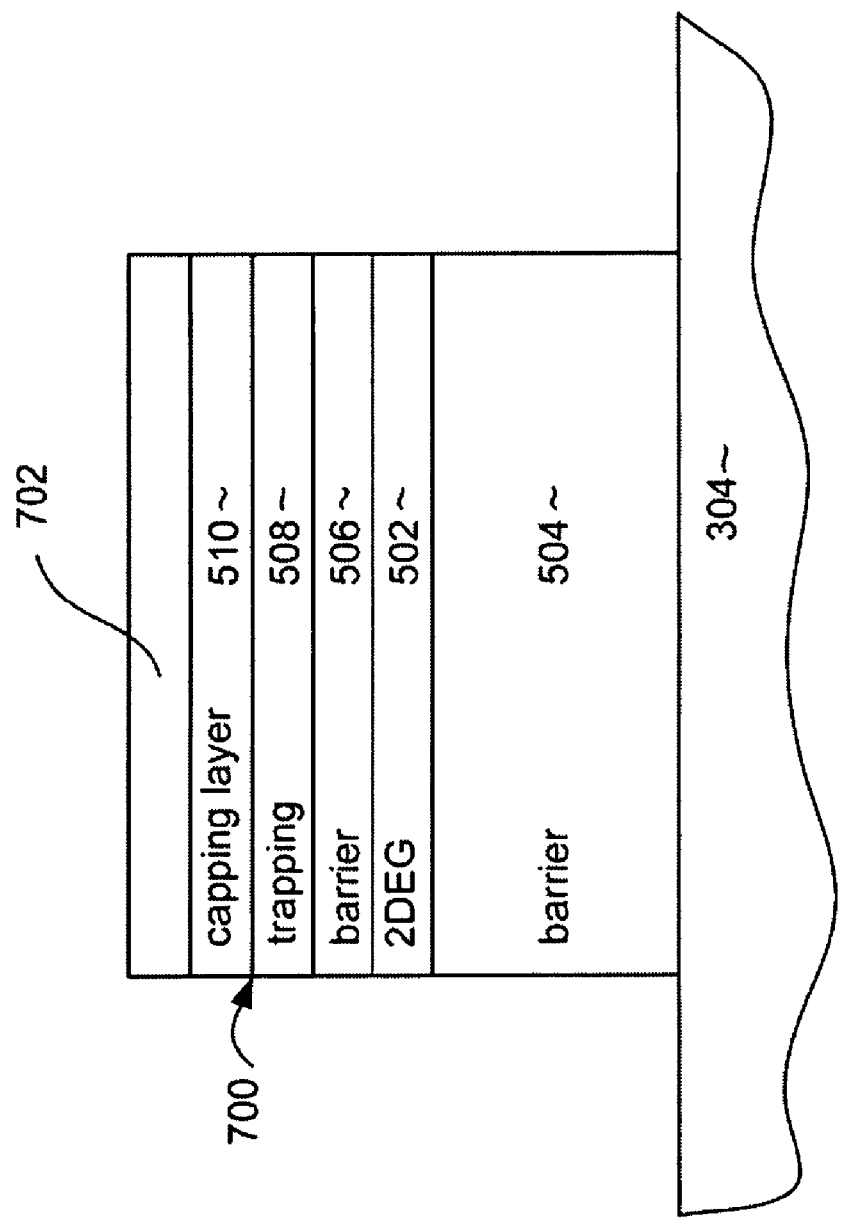
FIG. 7 is a cross sectional view of a sensor according to yet another embodiment of the invention.

The embodiments with a trapping layer comprising a wide bandgap semiconductor material inserted below the surface can also be combined with an ion implanted layer or a delta doping layer in the vicinity of the 2DEG channel to further control the carrier density said 2DEG channel With reference to FIG. 7, in another embodiment of the invention an ultra-thin, metallic gate electrode 702 is formed at the top (surface) of the sensor 700. An electric potential can be applied to the gate electrode 702 to effectively lower the surface potential, thereby trapping carriers in the InAs cap that would otherwise have migrated to the 2DEG. The shunt structure 507 (FIG. 5) has not been shown for purposes of clarity.

Figure 8:
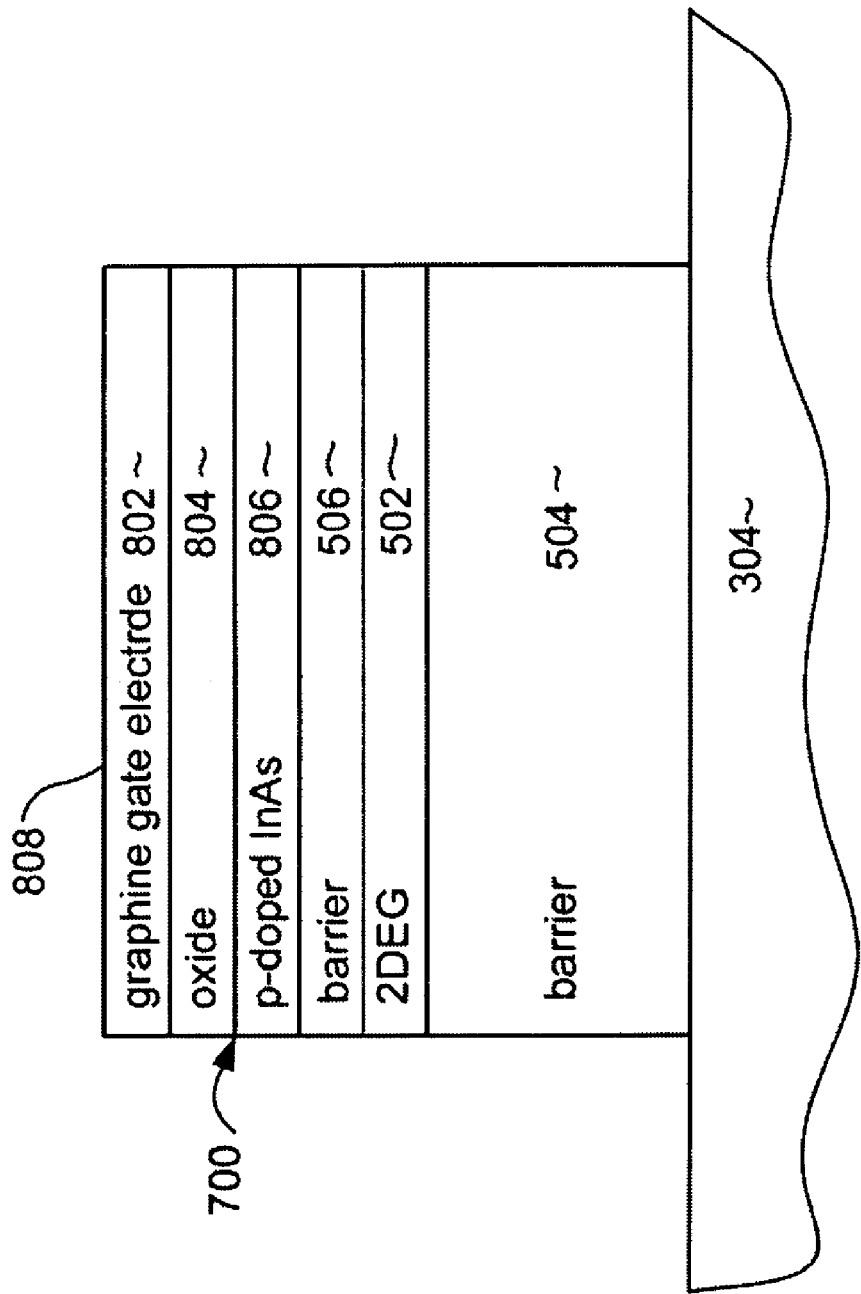
FIG. 8 is a cross sectional view of a sensor according to still another embodiment of the invention.

With reference now to FIG. 8, yet another embodiment of the invention includes a graphene gate electrode 802 formed over an oxide layer 804 and a p-doped layer 806, the oxide layer 804 being sandwiched between the p-doped layer 806 and the graphene gate electrode layer 802. The p-doped layer 806 is preferably a p-doped InAs layer. Note, also that the graphene can be in electrical contact with the cap (with no oxide barrier), forming a structure as in FIG. 7.

The graphene layer 802 is a single atomic sheet of graphitic carbon atoms that are arranged into a honeycomb lattice. It can be viewed as a giant two-dimensional Fullerene molecule, an unrolled single wall carbon nanotube, or simply a single layer of lamellar graphite crystal. Interest in graphene was triggered by its discovery (Novoselov, K. S. et al, Science 306, 666, 2004; Proc. Natl Acad. Sci., USA 102, 10451, 2005) and it has been the subject of numerous studies due to its unique transport properties and potential device applications. It is a stable and mechanically robust zero-gap semiconductor that displays ballistic electron transport at room temperature over submicron distances. At room temperature, it exhibits metallic properties. The electrical conductivity of graphene is excellent even at atomic mono-layer thicknesses. The carrier density of single atomic layer graphene is on the order of $10^{13}$ $cm^{-2}$. Therefore, for the purposes of this invention, it is a suitable top-gate electrode material ideally suited for mesoscopic, ultra-high sensitivity magnetic sensors in which the distance between the sense active area 502 and the surface 808 must be minimized.

The device described above with reference to FIG. 8 can be constructed by a series of photolithographic steps. The top-gate electrode 802 can be patterned to define the geometry of the working device (e.g. the geometry of the desired active area 502, which would correspond to the mesa structure 315 of FIG. 3). After liftoff, the top-gate electrode 802 only remains over the regions where carrier transport in the buried active layer 502 is required. The rest of the device is over-coated with a layer of a high quality oxide (not shown) such as alumina, grown, for example, by atomic layer deposition (ALD). This layer serves as a protective layer for the device.

Contact leads and bonding pads to the quantum well (active area) 502 structure can then be defined by a second lithographic step, wherein the top-gate electrode 802, the oxide 804, the p-doped layer 806 liner layer 506 are etched off. This can be followed by a metal evaporation onto the surface of the active layer 502. The etching of the aforementioned layers 802, 804, 806, 506 to provide an Ohmic contact to the quantum well can be at a different location away from the active area as defined by the patterned top-gate electrode.

Lead contact to the top-gate electrode 802 can then be defined in a separate photolithographic process. Unlike the contact leads for the InAs quantum well 502, of which there can be several, the point of contact for the bias electrode can be a single point located away from the location of the quantum well leads and bonding pads. For some device geometries, it is advantageous from a packing point of view to employ schemes where the contact leads for the InAs quantum well 502 and those for the top-gate electrode 802 are in different levels with respect to a plane perpendicular to the InAs quantum well 502.

Figure 9:
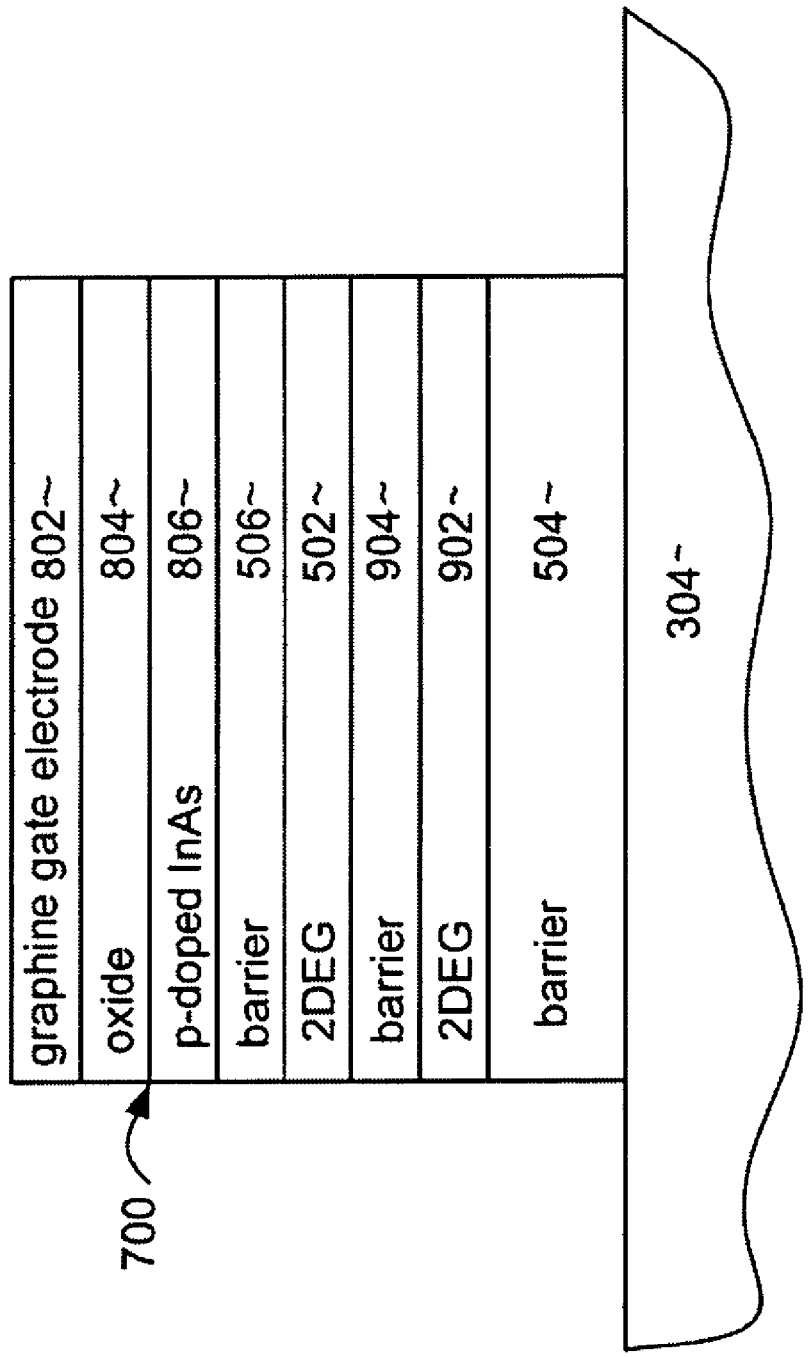
FIG. 9 is a cross sectional view of another embodiment of the invention.

With reference now to FIG. 9, to minimize the divergence of the electric field provided by the top electrode and therefore to confine the lateral width of the sensing quantum well channel, a second non-compensated quantum well channel 902 can be employed. This embodiment can also include an extra barrier layer 904 disposed between the quantum well layers 502, 902, which can separate the layers 504, 902 by just a few nanometers. The barrier layer 904, which can be AlSb, provides donor charge carriers for transport into the lower channel. In addition, other layers (not shown) below the lower quantum well structure 902 can be employed as remote doping layers to provide a high carrier density in the lower layer.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor, comprising:
   first and second barrier layers;
   a quantum well structure sandwiched between the first and second barrier layers; and
   an ultrathin trapping layer disposed between a surface of the sensor and the first and second barrier layers and quantum well structure, the trapping layer preventing migration of charge carriers from the surface of the sensor to the quantum well structure.

2. A magnetoresistive sensor as in claim 1 wherein the quantum well structure comprises a two dimensional electron gas.

3. A magnetoresistive sensor as in claim 1 wherein the quantum well structure comprises a two dimensional hole gas.

4. A magnetoresistive sensor as in claim 1 wherein the trapping layer comprises an oxide layer.

5. A magnetoresistive sensor as in claim 1 wherein the trapping layer comprises a large bandgap semiconductor material.

6. A magnetoresistive sensor as in claim 1 wherein the trapping layer comprises an ion implanted AlSb barrier layer.

7. A magnetoresistive sensor as in claim 6 wherein the ion implantation is performed through a photolithographically defined mask.

8. A magnetoresistive sensor as in claim 1 wherein the trapping layer comprises an ion implanted InAs capping layer.

9. A magnetoresistive sensor as in claim 1 further comprising a biased metal gate electrode formed on a capping layer.

10. A magnetoresistive sensor as in claim 9 wherein the capping layer comprises InAs or GaSb.

11. A magnetoresistive sensor as in claim 9 wherein the gate electrode is patterned to define a modulation of a sheet carrier density in the quantum well.

12. A magnetoresistive sensor as in claim 11 wherein the gate electrode material is highly conducting metal such as Au, Pt, Rh and their alloys.

13. A magnetoresistive sensor as in claim 1 further comprising a capping layer formed over the trapping layer, between the trapping layer and the surface of the sensor.

14. A magnetoresistive sensor as in claim 1 wherein the first and second barrier layers each comprise AlSb and the quantum well structure comprises InAs.

15. A magnetoresistive sensor, comprising:
    first and second barrier layers;
    a quantum well structure sandwiched between the first and second barrier layers; and
    an ultrathin trapping layer disposed between a surface of the sensor and the first and second barrier layers and quantum well structure, the trapping layer preventing migration of charge carriers from the surface of the sensor to the quantum well structure; wherein the trapping layer comprises Si or Be-doped AlSb.

16. A magnetoresistive sensor, comprising:
    first and second barrier layers;
    a quantum well structure sandwiched between the first and second barrier layers; and
    an ultrathin trapping layer disposed between a surface of the sensor and the first and second barrier layers and quantum well structure, the trapping layer preventing migration of charge carriers from the surface of the sensor to the quantum well structure; wherein the trapping layer comprises a Si or Be-doped InAs.

17. A magnetoresistive sensor, comprising:
    first and second barrier layers;
    a quantum well structure sandwiched between the first and second barrier layers; and
    an ultrathin trapping layer disposed between a surface of the sensor and the first and second barrier layers and quantum well structure, the trapping layer preventing migration of charge carriers from the surface of the sensor to the quantum well structure; wherein the quantum well structure is located a distance of less than 7 nm from the surface of the sensor.

* * * * *